May 19, 1970  R. O. WELTY  3,512,266

DRYING POLYMERIC MATERIAL

Filed June 24, 1968

INVENTOR.
R. O. WELTY

BY

ATTORNEYS

United States Patent Office 3,512,266
Patented May 19, 1970

3,512,266
DRYING POLYMERIC MATERIAL
Richard O. Welty, Bartlesville, Okla., assignor to Phillips Petroleum Company, a corporation of Delaware
Filed June 24, 1968, Ser. No. 739,563
Int. Cl. F26b 3/36
U.S. Cl. 34—42                                      7 Claims

ABSTRACT OF THE DISCLOSURE

Liquid-bearing polymeric material, such as wet rubber crumb, is dried by passing the material through an elongated enclosure where it is subjected to mechanical work which heats the material but keeps it under sufficient pressure to prevent the liquid from vaporizing within the enclosure. When the material is discharged, the sudden pressure reduction permits the liquid to vaporize using the sensible heat of the material itself for heat of vaporization. By reducing the pressure developed in the mechanical working in two steps rather than in one, the liquid is vaporized on discharge of the material without disrupting the material into discrete particles.

Figure 1:
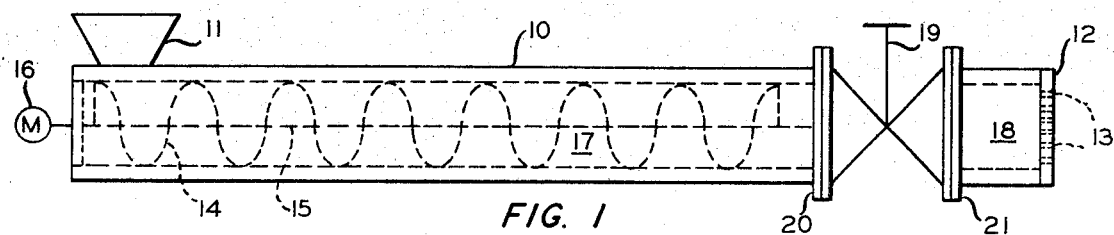

This invention relates to a method of removing liquid from polymeric material. In another aspect it relates to an improvement in an expander-dryer whereby liquid can be removed from polymeric material without producing excessive fines.

In the production of solid polymers such as rubber and resins and in the processing of natural rubber or other polymeric material, it is frequently necessary to be able to remove liquid, such as an organic solvent or water, from the material by vaporization without degrading the polymeric material itself.

One method which has been used very successfully to deliquefy polymers and particularly synthetic rubber crumb involves the use of a continuous extrusion device which is generally referred to as an expander-dryer. This device applies mechanical energy to the liquid-bearing polymeric material by working the material with a rotating screw within an elongated enclosure which can be jacketed to permit additional heating by indirect heat exchange. The polymeric material is worked in this way sufficiently to increase its temperature so that its sensible heat is sufficient to provide the heat of vaporization of most of the liquid which is to be removed. The elevated pressures developed within the device are sufficient to prevent vaporization of the liquid within the enclosure, but immediately upon discharge of the material through an orifice, the pressure is released and the liquid vaporizes with an explosive effect enabling rapid and almost complete removal of the liquid from the polymeric material. In addition, the polymeric material after being discharged from the expander-dryer is left in an expanded, semi-porous condition which enables the remaining moisture to be easily vaporized by heating at temperatures which are not excessive and do not degrade the polymer.

An expander-dryer which is widely used in the rubber industry is one marketed by V. D. Anderson Company and is described in the patent to Zies, U.S. 3,222,797 issued Dec. 14, 1965. The use of an expander-dryer of this type in a continuous recovery operation for the manufacture of synthetic rubber is described in the patent to Davis, U.S. 3,240,746 issued Mar. 15, 1966.

While some polymers can be dried with an expander-dryer at suitable rates without difficulty, some polymeric materials have a tendency to disintegrate into fine particles during the explosive vaporization which occurs upon discharge of the material from the discharge orifices of the dryer die plate. Although the production of discrete particles does not diminish the effectiveness of the drying operation, it produces a housekeeping problem since the fines are more difficult to confine and convey to subsequent drying and baling operations. These fines tend to accumulate on surfaces which they contact, requiring frequent cleaning. Also accumulated fines near the die plate tend to accumulate liquid water and it has been found that this is a source of white spots which sometimes are observed in baled rubber. The production of particles of a polymer at this point in the operation with the accompanying fines inevitably results in an increased amount of recycle of polymer which has reached as high as 10 to 15 percent of the net production.

According to this invention, a method and apparatus are provided which substantially eliminates the formation of particulate polymer from the expander-dryer with substantial decrease in the amount of polymer which must be recycled or reworked. This problem can be solved according to the invention without materially sacrificing production rates. According to this invention, substantially all liquid can be removed from liquid-bearing polymeric material by passing it through elongated enclosure to a discharge point while developing a pressure on this material and performing mechanical work on it sufficient to increase its temperature to a point where its sensible heat is sufficient to vaporize liquid contained therein upon release of the pressure thus developed. This pressure which is developed within the enclosure is sufficient to maintain the liquid in the liquid state while it is within the enclosure so that vaporization does not occur until the material is discharged. The improvement in this operation according to this invention comprises reducing the pressure which is developed within the enclosure in two steps, first reducing the pressure to a substantially lower value immediately upstream of the discharge point, this reduced pressure being still sufficient to maintain the liquid in the liquid state, and then reducing the pressure in a second step to the pressure outside of the enclosure which permits the liquid to vaporize using the heat contained in the material itself.

The apparatus of this invention comprises an elongated shell having an upstream feed opening and a downstream discharge point and containing a helical screw in the upstream end of the enclosure for working and compaction of the material which is passed through the enclosure. The improvement provided by this invention comprises means for restricting the passage of the material from the zone containing the helical screw to a downstream zone adjacent the discharge point so as to impose a reduction in the pressure on the material which has passed said restriction means, in combination with orifice means downstream of said restriction means at said restriction point sized to enable further pressure reduction on the material passing through the orifice means while maintaining the pressure upstream of the orifice means sufficient to prevent vaporization of liquid in the polymeric material.

It is an object of this invention to provide an improved method of drying liquid-bearing polymeric material.

Another object is to provide an improved apparatus of the expander-dryer type which enables the drying of liquid-bearing polymeric material without the production of troublesome fine particles of the material.

Another object of this invention is to provide an improvement in the method and apparatus for drying rubber without the production of fine rubber particles by the explosive vaporization of the liquid.

Another object is to minimize the amount of reworking and equipment cleaning which is required in the drying of synthetic rubber.

Figure 3:
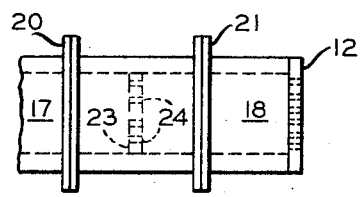
Figure 2:
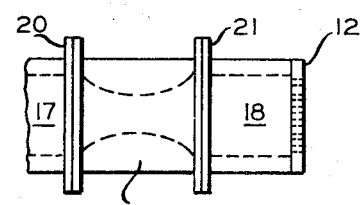
Figure 5:
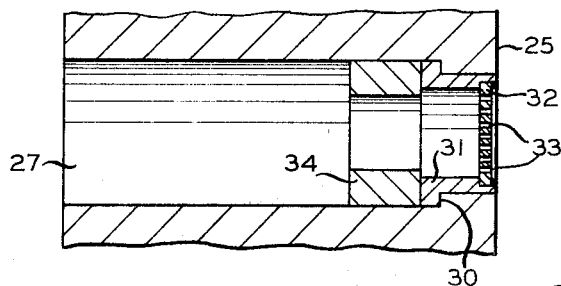
Figure 6:
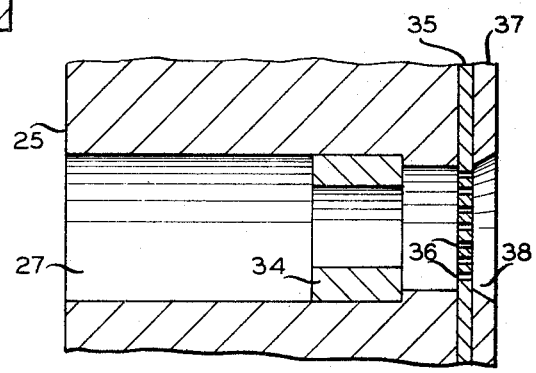
Figure 4:
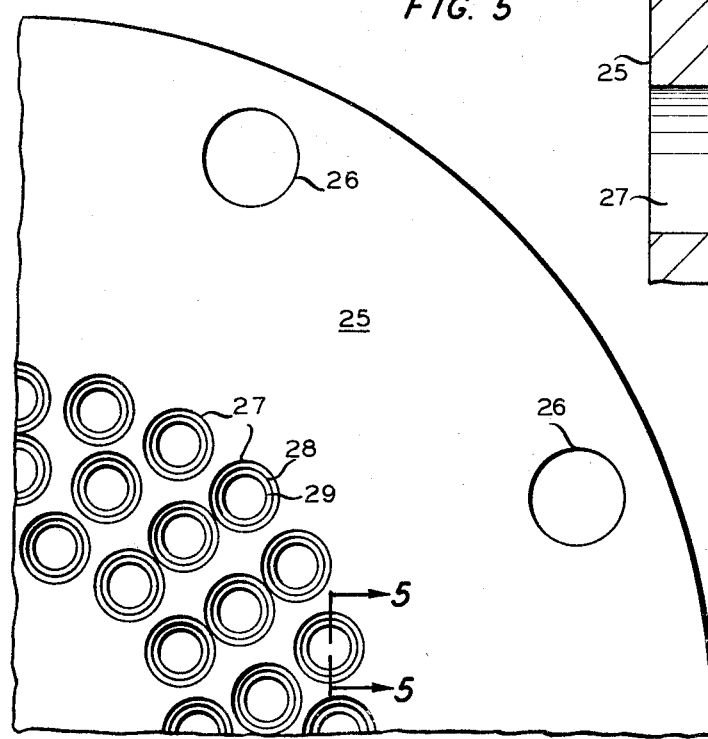

Other objects, advantages and features of this invention will be apparent from the following discussion and drawing in which:

FIG. 1 is a schematic representation of an expander-dryer illustrating a variable restriction means between the screw and discharge point; FIGS. 2 and 3 represent alternative pressure reduction means which can be positioned between the screw and discharge point of the expander-dryer; FIG 4 is an end view of a quarter-section of a die plate which has been modified to incorporate restriction means within the holes of the die plate itself; and FIGS. 5 and 6 are sectional views of two embodiments of the die plate incorporating the restriction means positioned within the holes thereof.

As explained above, the apparatus which is improved according to this invention is described in the patent to Zies and its use in the drying of synthetic rubber is described in the patent to Davis. It has been found that the invention is particularly valuable in overcoming problems in the formation of fines in the drying of the synthetic rubbers such as polybutadiene and copolymers of butadiene and styrene. While the method and apparatus of this invention can be applied for the removal of liquid from any liquid-bearing polymeric material, as pointed out by Zies, the improvement of this invention is particularly valuable in the removal of water from rubbery polymers.

In the production of synthetic rubber a wet crumb of coagulum is usually obtained as described in the patent of Davis and the water from this wet crumb can be partially removed by pressing or centrifugation. The polymer which is to be dried by the apparatus and method of this invention generally contains about 5 to 20 weight percent water on a dry basis. This wet coagulum is fed to the upstream end of the expander-dryer and is passed through the elongated enclosure of this device by the action of a helical screw. Sufficient restriction to the polymer flow in the screw zone is provided to increase the residance time of the polymer in the zone and thus to subject the polymer to considerable mechanical work. A relatively high polymer temperature is developed, at least sufficient to vaporize the desired amount of water from the polymer once the pressure is released.

The capacity of the dryer is limited in large measure by the requirement that the restriction on flow from the discharge point be sufficient to enable the high temperatures required for the mechanical working operation to be developed within the working zone. The pressure must also be sufficient to prevent liquid from vaporizing within the dryer since it is undesirable to form vapor within the enclosure of the dryer itself. Any vapor formed would not only reduce the heat transfer rate from the jacketed area of the dryer but would intermittently jet from the discharge orifices and cause the polymer to issue in particles or short strands rather than as continuous strands. The pressure developed for the purpose of working synthetic rubber, however, is usually substantially in excess of the pressure required to maintain the liquid in the liquid state. In the drying of synthetic rubber, this pressure is generally at least about 600 p.s.i.g. and can be as high as 1500 p.s.i.g. Generally, however, the pressure does not exceed 900 p.s.i.g.

The water can be prevented from vaporizing with the troublesome formation of steam within the dryer enclosure if the pressure immediately upstream of the discharge point is maintained at least at 150 p.s.i.g. when employing an operating temperature at the die plate of about 350° F. Satisfactory die plate temperatures for the drying of synthetic rubber are about 300 to 400° F.

According to the invention the pressure within the material is reduced from the working zone pressure of at least about 600 p.s.i.g. to an intermediate pressure which is still sufficient to prevent liquid in the polymer from vaporizing but which reduces the pressure drop across the discharge point to a level which does not result in the disruption of the surface of the polymeric material sufficient to produce separate particles. The most desirable pressure drop across the discharge for a particular polymer drying operation can be found with very few trials, but it is very important that the combination of high pressure within the first working zone of the dryer with a substantially reduced pressure immediately upstream the discharge point be maintained.

This reduced pressure is obtained by providing a restriction to the flow of polymeric material between the working zone in the dryer, which is the zone containing the helical screw, and the discharge point which are the final orifices between the enclosed volume of the drier and the atmosphere. Although the dryer itself can be placed within a chamber in which the pressure outside of the dryer is either elevated or reduced below atmospheric pressure for the purposes of this invention the pressure in the volume outside of the enclosure of the dryer is considered to be 0 p.s.i.g., and as a practical matter this pressure is usually the prevailing atmospheric pressure.

The moisture in the rubber as it comes from the expander-dryer, following the sudden vaporization of the water upon release of presssure, is generally about 1 to 3 weight percent on a dry basis. The reduced pressure which is immediately upstream of the discharge point is usually at least about 150 p.s.i.g. and generally does not exceed 400 p.s.i.g. Consequently the pressure reduction across the discharge orifices is in the range of about 150 to 400 p.s.i.g., and it has been found that such a pressure can be dissipated from within the rubber without the formation of fines. The rubber thus issues from the dryer in the form of continuous strands which are advantageously handled in downstream processing steps. Operating the working zone at this discharge pressure reduction without an intermediate pressure reduction would, however, not permit sufficient working within the expander-dryer to provide the required heat of vaporization. It is, therefore, necessary that there be an intermediate pressure reduction of about 200 to 750 p.s.i. This pressure reduction can be provided in a number of different ways which are illustrated in the drawing.

Referring to FIG. 1, an expander-dryer of the type described by Zies is disclosed schematically. This dryer comprises an elongated enclosure 10 which contains a feed hopper 11 and a die plate 12 at the discharge end. The die plate is provided with a number of orifices 13. The rubber which is fed to the expander-dryer is moved through the enclosure 10 and subjected to mechanical work by helical screw 14 on shaft 15 driven by motor 16. The helical screw is positioned within an upstream zone 17 of the elongated enclosure and it is within this zone that the working pressure must be developed. This working pressure is understood to be the maximum pressure developed within this zone and is determined at the downstream end of the working zone 17. According to this invention, a second zone 18 is provided within the elongated enclosure immediately upstream of the discharge point. As shown in FIG. 1, the pressure reduction between zones 17 and 18 is provided by a valve 19 which is illustrated, for ease of installation, mounted between flanges 20 and 21.

While valve 19 shown in FIG. 1 is variable restriction means, it is usually not necessary to change the pressure drop between zones 17 and 18 once optimum operating conditions for a particular drying operation have been established. Fixed pressure reducing means are illustrated in FIGS. 2 and 3. In FIG. 2, for example, a fixed restriction is provided by a venturi 22 and in FIG. 3 a fixed restriction is provided by a plate 23 having a plurality of orifices 24.

A preferred embodiment of my invention is illustrated in FIGS. 4, 5 and 6 which show a modification of the die plate of a conventional expander-dryer of the Zies type to provide the desired 2-step pressure reduction. While in the Zies expander-dryer the maximum pressure is reached just ahead of the discharge die plate, this pressure is determined by the restriction offered by the discharge apertures which can be varied by the use of inserts contained within the holes of the die plate. According to the improvement of this invention, the pressure immediately upstream of the die plate and the pressure in the working zone is maintained by the combination of a restriction within each hole of the die plate and multiple orifices or apertures terminating each of these die plate holes. This modification of the improved die permits the use of a greater open discharge area while maintaining the same over-all pressure drop between the working zone and the atmosphere. By reducing the pressure immediately upstream of the discharge apertures, however, the rubber has a lower exit velocity. This eliminates the extreme explosive nature of the 1-step decompression with a consequent production of fines but instead divides the decompression over two steps with sufficient final pressure reduction for escape of water vapor without disrupting the continuous rubber strands.

FIG. 4 is a downstream elevational view of a quarter-section of the die plate 25. This die plate is equipped with holes 26 for mounting bolts. Toward the center of the die plate are a number of die plate holes 27 which are generally arranged in a uniform pattern and in sufficient number to permit the required production rates. In the view of FIG. 4 the discharge apertures of the orifice plates have not been shown, but the orifice plate retention ring 28 and choke 29 are visible in each die plate hole.

FIG. 5 is a sectional view of one of the die plate holes. Each die plate hole is machined to provide a shoulder 30 to accept the orifice plate retention ring 31. The orifice plate 32 can be welded to each retention ring 31 and each orifice plate has a number of small apertures 33. Positioned upstream of the orifice plate is a choke 34 which is a sleeve of reduced internal diameter. It is this choke which provides most of the pressure reduction from the developed pressure upstream of the die plate to the discharge pressure upstream of the orifice plate. The internal diameter and the length of the choke can be varied in a number of ways to provide this pressure reduction, and as will be readily recognized, increases in the length of the choke would permit enlarging its internal diameter to effect the same pressure drop. It is possible for the choke and the retention ring to be machined from one piece and it is possible for the internal diameter of the choke and the retention ring to be the same by increasing the length of the choke section.

The retention ring can be eliminated by using a single orifice plate which covers the whose face of the die plate rather than a separate orifice plate for each of the die plate holes. This embodiment is illustrated in FIG. 6, which shows a single orifice plate 35 in which there are provided multiple groups of apertures 36 positioned to coincide with the openings of the die plates holes 27. The orifice plate 35 is retained on the face of the die plate by back-up plate 37, which has an opening 38 also positioned to coincide with each of the die plate holes.

In order to illustrate this invention further, the following examples are presented:

EXAMPLE I

Cis-1,4 polybutadiene rubber crumb containing about 8 percent water was dried in an expander-dryer manufactured by V. D. Anderson Company and of the type described by the patent to Zies U.S. 3,222,797. A die plate with 14 holes was used, with each of the die plate holes terminated by a perforated plate containing 19 holes of 0.083 inch diameter. Die temperature was 315° F. The pressure immediately upstream of the die plate was 620 to 660 p.s.i.g. The rubber discharged from the dryer was substantially dry, but a large amount of fines was produced requiring about 10 to 15 percent rework.

The die plate was then modified to provide 49 holes each terminated by a perforated plate providing 16.5 percent open area. Upstream of each of the perforated plates was positioned a choke within the die plate hole, each choke having an internal diameter of $21/32$ inch and a length of 1 inch. The die temperature was 328° F. and the pressure immediately upstream of the die plate was 660 p.s.i.g., indicating a satisfactory pressure and temperature development within the dryer. The rubber discharge contained only 0.54 percent water and no fines were produced.

The operation was repeated with a modified die plate using 56 holes, each terminated by an orifice plate providing 36 percent open area with a choke of an internal diameter of $7/16$ inch and a length of 1 inch. The die plate temperature was 328° F. and the pressure 660 p.s.i.g. Substantially dry rubber was recovered with no fines produced.

EXAMPLE II

Cis-1,4 polybutadiene rubber crumb containing about 8 percent water was fed to a V. D. Anderson expander-dryer at a temperature of about 85° F. Over a period of 48 hours the number of holes in the die plate was varied from 36 to 56 with each of the holes terminated by an orifice plate having 37 percent open area, the diameter of each orifice being 0.045 inch. The die plate holes were 3 inches long and the retention rings were $5/8$ inch internal diameter and $1/2$ inch long. The approach chokes immediately upstream from the retention rings were $1/2$ inch long and $1/2$ inch internal diameter. The average die plate temperature was 354° F. The developed pressure was approximately 800 p.s.i.g. and the reduced pressure was approximately 400 p.s.i.g. Substantially no fines were produced and the average moisture content in the rubber bales was only 0.28 percent.

Certain modifications of the invention will become apparent to those skilled in the art and the illustrative details disclosed are not to be construed as imposing unnecessary limitations on the invention.

I claim:

1. In a method for removing substantially all liquid from a liquid-bearing polymeric material in which the material is passed through at least two sequential zones in an elongated enclosure to a discharge point while developing a pressure and performing mechanical work on said material in the first of said zones sufficient to increase the temperature of the material such that the sensible heat therein is sufficient to vaporize a contained liquid upon release of the pressure thus developed to the pressure existing outside of said enclosure and said developed pressure is sufficient to maintain said liquid in its liquid state, and said material is passed through the second of said zones and discharged from said enclosure thereby instantaneously releasing pressure on the material whereby the liquid suddenly vaporizes and escapes from said material by utilizing the sensible heat thereof, the improvement which comprises reducing said developed pressure in said first zone to a substantially lower pressure in said second zone immediately upstream of said discharge point, said second pressure being still sufficient to maintain said liquid in the liquid state, and reducing the pressure on said material from said second pressure to the pressure outside said enclosure as said material passes through said discharge point to a zone outside said enclosure, thereby vaporizing said liquid without rupturing the surface of the polymeric material sufficiently to produce discrete partices thereof.

2. The process of claim 1 wherein said developed pressure is in the range of about 600 to 900 p.s.i.g., the difference between said devoleped pressure and said second pressure is in the range of about 200 to 750 p.s.i.g., and said second pressure is in the range of about 150 to 400 p.s.i.g. with the pressure outside of said enclosure being as 0 p.s.i.g.

3. The process of claim 2 wherein said polymeric material is a rubbery polymer containing from 5 to 20 weight percent water on a dry basis as it is fed to said elongated enclosure and about 1 to 3 weight percent water after discharge from said enclosure.

4. The method of claim 3 wherein said rubbery polymer is polybutadiene or a copolymer of butadiene and styrene.

5. In apparatus for removing liquid from liquid-bearing polymeric material comprising an elongated shell having an upstream feed opening and downstream discharge point and containing a helical screw in a first zone within said enclosure for the working and compaction of the material passed therethrough and through a downstream zone to the discharge end of said elongated enclosure, the improvement comprising, in combination, means for restricting the passage of material from said first zone to said downstream zone adjacent said discharge point so as to impose a reduction in the pressure on the material passing past said restriction means, and orifice means downstream from said restriction means and at said discharge point sized to enable further pressure reduction on material passing through said orifice means, said restriction and orifice means being positioned in multiple holes in a die plate positioned at the downstream end of said enclosure, said orifice means comprising an orifice plate terminating each of said holes, said orifice plate containing a plurality of smaller holes, and said restriction means comprising a choke positioned in each of said holes sized to effect a substantial decrease in pressure on material passing through said choke to a point immediately upstream of said orifice plate.

6. The apparatus of claim 5 wherein each of said orifice plates and restrictive chokes are removable inserts in the holes of said die plate.

7. The apparatus of claim 6 in which said orifice plates contain from 10 to 45 percent free area and each of said chokes has a diameter which is less than the diameter of the orifice plates and are spaced from said orifice plates.

References Cited

UNITED STATES PATENTS

| | | | |
|---|---|---|---|
| 3,222,797 | 12/1965 | Zies | 34—17 |
| 3,323,222 | 6/1967 | Skidmore et al. | 34—17 |
| 3,370,358 | 2/1968 | Esser | 34—17 X |

EDWARD J. MICHAEL, Primary Examiner